United States Patent
Verma et al.

(10) Patent No.: US 11,651,447 B2
(45) Date of Patent: May 16, 2023

(54) LEDGER-BASED IMAGE DISTRIBUTION PERMISSION AND OBFUSCATION

(71) Applicant: Kyndryl, Inc., New York, NY (US)

(72) Inventors: Pramod Verma, Fairfax, VA (US); Richard Daniel Gunjal, Bangalore (IN)

(73) Assignee: KYNDRYL, INC., New York, NY (US)

( * ) Notice: Subject to any disclaimer, the term of this patent is extended or adjusted under 35 U.S.C. 154(b) by 741 days.

(21) Appl. No.: 16/669,689

(22) Filed: Oct. 31, 2019

(65) Prior Publication Data

US 2021/0133355 A1 May 6, 2021

(51) Int. Cl.
| | | |
|---|---|---|
| *G06F 21/00* | (2013.01) | |
| *G06Q 50/00* | (2012.01) | |
| *G06F 21/62* | (2013.01) | |
| *G06F 21/60* | (2013.01) | |
| *G06V 40/16* | (2022.01) | |
| *G06F 18/22* | (2023.01) | |

(52) U.S. Cl.
CPC ............. *G06Q 50/01* (2013.01); *G06F 18/22* (2023.01); *G06F 21/602* (2013.01); *G06F 21/6254* (2013.01); *G06V 40/161* (2022.01); *G06V 40/166* (2022.01); *G06V 40/172* (2022.01)

(58) Field of Classification Search
CPC .... G06Q 50/01; G06K 9/6215; G06F 21/602; G06F 21/6254; G06V 40/166
USPC .......................................................... 726/26
See application file for complete search history.

(56) References Cited

U.S. PATENT DOCUMENTS

| | | |
|---|---|---|
| 8,744,143 B2 | 6/2014 | Chen |
| 9,292,675 B2 | 3/2016 | Husain |
| 9,378,217 B2 * | 6/2016 | Mickeleit ............... G06F 16/183 |
| 9,578,053 B2 | 2/2017 | Husain et al. |
| 10,839,104 B2 * | 11/2020 | Balzer ................. H04L 63/0421 |
| 2008/0298687 A1 | 12/2008 | Lai et al. |
| 2012/0036452 A1 | 2/2012 | Coleman et al. |
| 2012/0250951 A1 | 10/2012 | Chen |

(Continued)

FOREIGN PATENT DOCUMENTS

| | | |
|---|---|---|
| CN | 101089874 A | 12/2007 |
| CN | 101089874 B | 8/2010 |
| WO | 2014073171 A1 | 5/2014 |

OTHER PUBLICATIONS

Chakravorty et al., Ushare: user controlled social media based on blockchain, Research Gate, IMCOM '17, Jan. 5-7, 2017, https://www.researchgate.net/publication/312211808_Ushare_user_controlled_social_media_based_on_blockchain.

*Primary Examiner* — Josnel Jeudy
(74) *Attorney, Agent, or Firm* — Dan Housley; Andrew M. Calderon; Calderon Cafran & Cole, P.C.

(57) ABSTRACT

Using an image analysis model within an image intended for distribution online, an image portion depicting personally identifiable information is identified, the personally identifiable information comprising image data usable to identify a specific individual. Using an online profile, a person depicted in the image portion is identified. A transaction is posted in a publicly-accessible distributed encrypted ledger, the transaction comprising an encrypted request to allow the image to be distributed online. According to a response to the request, the image portion is obfuscated, the obfuscating comprising altering data of the image portion, the altering making the image portion unusable to identify the person.

20 Claims, 7 Drawing Sheets

(56) References Cited

U.S. PATENT DOCUMENTS

| | | | |
|---|---|---|---|
| 2012/0272160 A1* | 10/2012 | Spivack | G06N 5/046 715/752 |
| 2013/0236070 A1 | 9/2013 | Sliwinski | |
| 2014/0181195 A1* | 6/2014 | Sullivan | H04L 67/535 709/204 |
| 2014/0307116 A1* | 10/2014 | Zhang | G06V 20/52 348/211.99 |
| 2015/0169854 A1 | 6/2015 | Chang et al. | |
| 2015/0199501 A1 | 7/2015 | Husain | |
| 2015/0295926 A1 | 10/2015 | Husain et al. | |
| 2016/0006730 A1 | 1/2016 | Chari et al. | |
| 2016/0127641 A1 | 5/2016 | Gove | |
| 2016/0182816 A1 | 6/2016 | Luk et al. | |
| 2019/0042085 A1* | 2/2019 | Barnett | G06F 3/0481 |
| 2019/0207914 A1* | 7/2019 | Gong | H04L 63/0428 |
| 2022/0060514 A1* | 2/2022 | Hu | H04L 63/20 |

\* cited by examiner

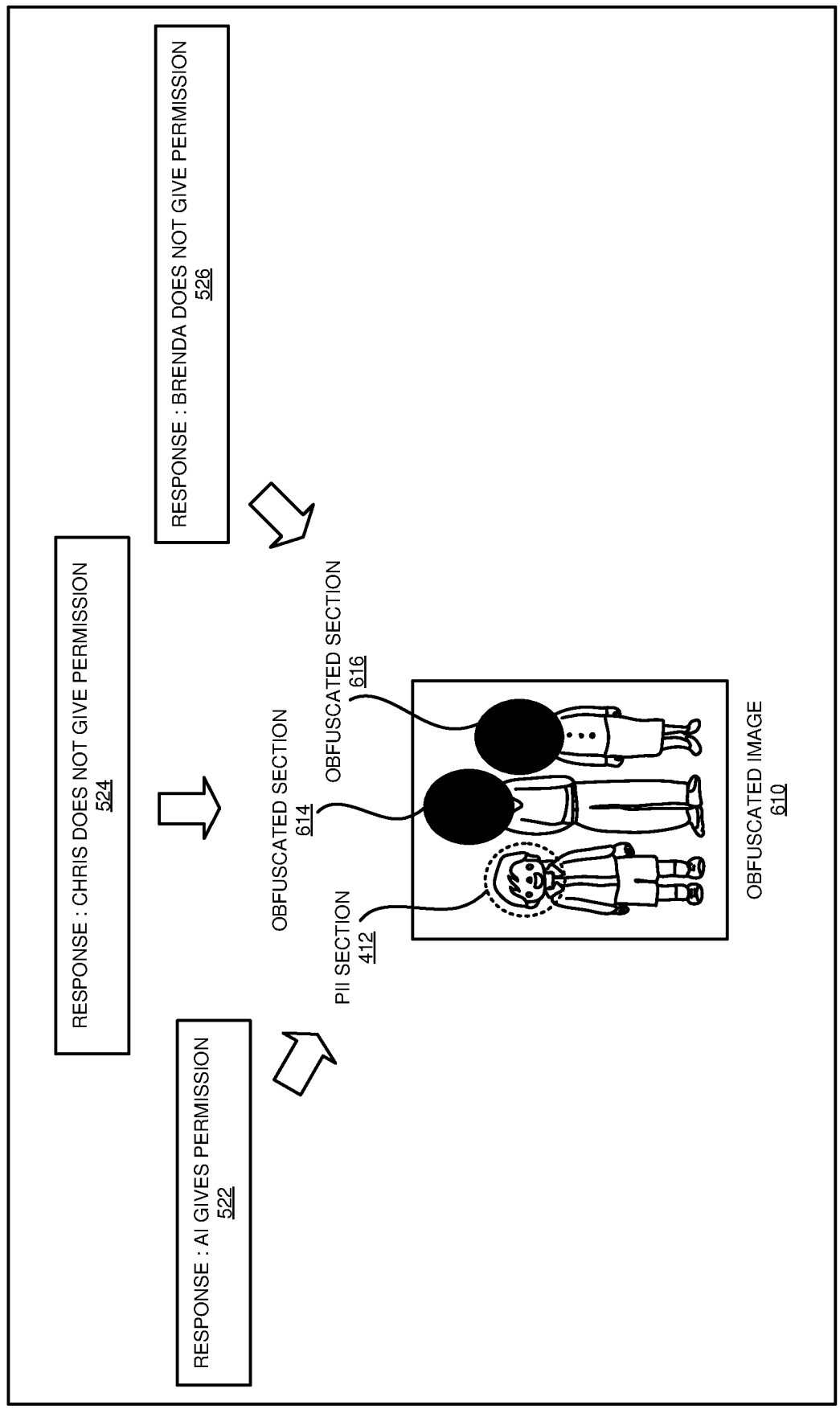

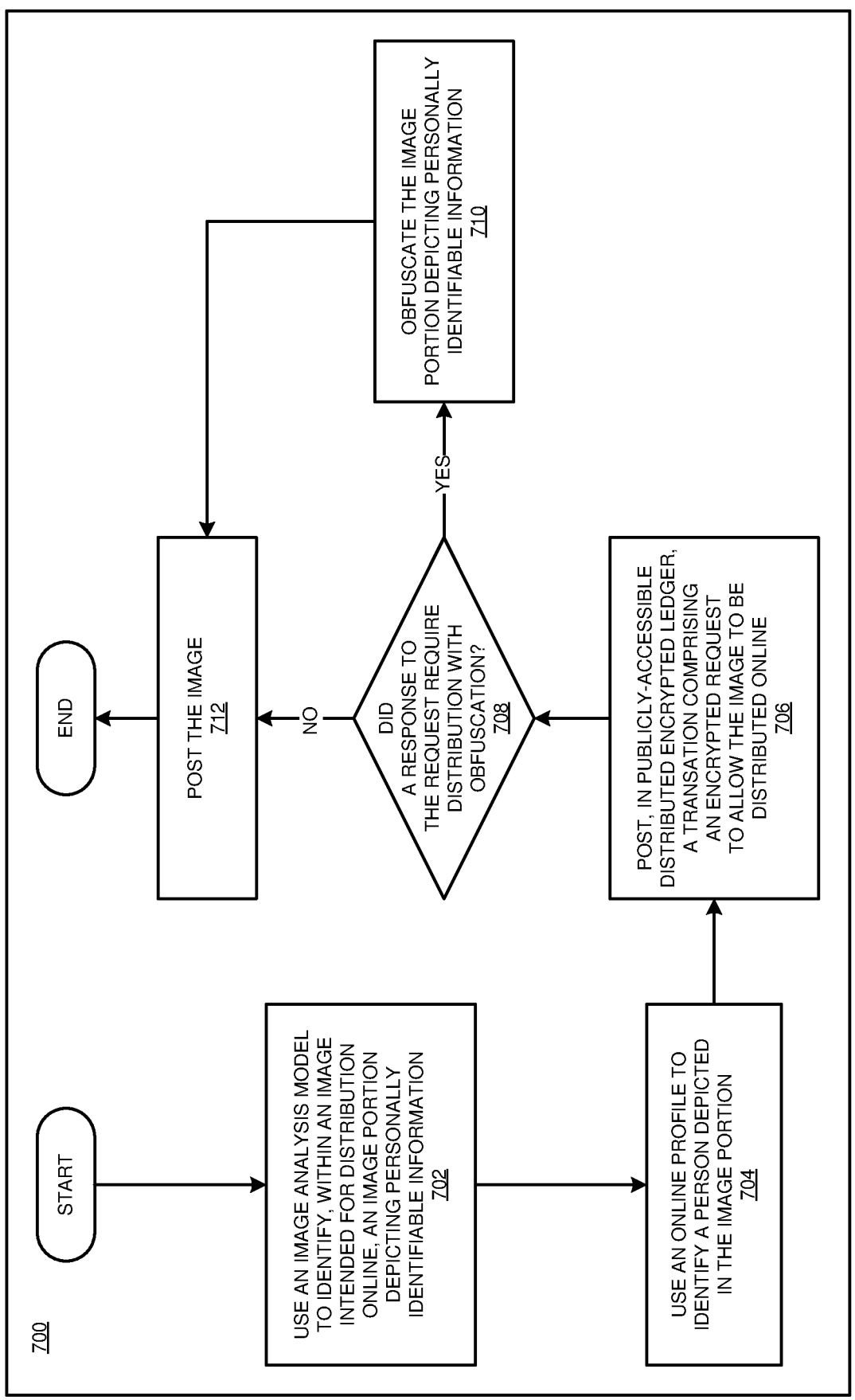

LEDGER-BASED IMAGE DISTRIBUTION PERMISSION AND OBFUSCATION

TECHNICAL FIELD

The present invention relates generally to a method, system, and computer program product for image distribution management. More particularly, the present invention relates to a method, system, and computer program product for ledger-based image distribution permission and obfuscation.

BACKGROUND

Personally identifiable information (PII) is data usable to identify a specific individual. A person's name, telephone number, and taxpayer identification number are all non-limiting examples of personally identifiable information. Image data can also be personally identifiable information. Some non-limiting examples of image data that can be personally identifiable information include an image of a person's face, fingerprint, palm print, a vein pattern in one's palm or another area of a body, geometry of a face, hand, or another body part, iris, retina, or other image data usable to identify a specific individual. In addition, image data may be usable in combination with another type of data to identify a specific individual. For example, an image of a partial fingerprint might match with a group of people. However, the same image of a partial fingerprint, combined with data of which city or neighborhood a person lives in, may be sufficient to identify a single individual within the group.

A social network is a website or application which enables users to communicate with each other using text, images, audio, video, and other forms of electronic communication. Communications over a social network are referred to as messages. Messages can be one-to-one (i.e., between two users) or one-to-many (i.e., from one sender to a group of recipients). Some communications over a social network are private between recipients, while others are visible to users other than a message's sender and recipient.

A user of a social network has a profile. The profile includes information about the user, including contact information for the user within or outside the social network. The profile optionally also includes image data associated with the user, for example an image depicting the user.

SUMMARY

The illustrative embodiments provide a method, system, and computer program product. An embodiment includes a method that identifies, using an image analysis model within an image intended for distribution online, an image portion depicting personally identifiable information, the personally identifiable information comprising image data usable to identify a specific individual. An embodiment identifies, using an online profile, a person depicted in the image portion. An embodiment posts, in a publicly-accessible distributed encrypted ledger, a transaction, the transaction comprising an encrypted request to allow the image to be distributed online. An embodiment obfuscates, according to a response to the request, the image portion, the obfuscating comprising altering data of the image portion, the altering making the image portion unusable to identify the person.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a continued example of ledger-based image distribution permission and obfuscation in accordance with an illustrative embodiment; and FIG. 7 depicts a flowchart of an example process for ledger-based image distribution permission and obfuscation in accordance with an illustrative embodiment.

DETAILED DESCRIPTION

Figure 1:
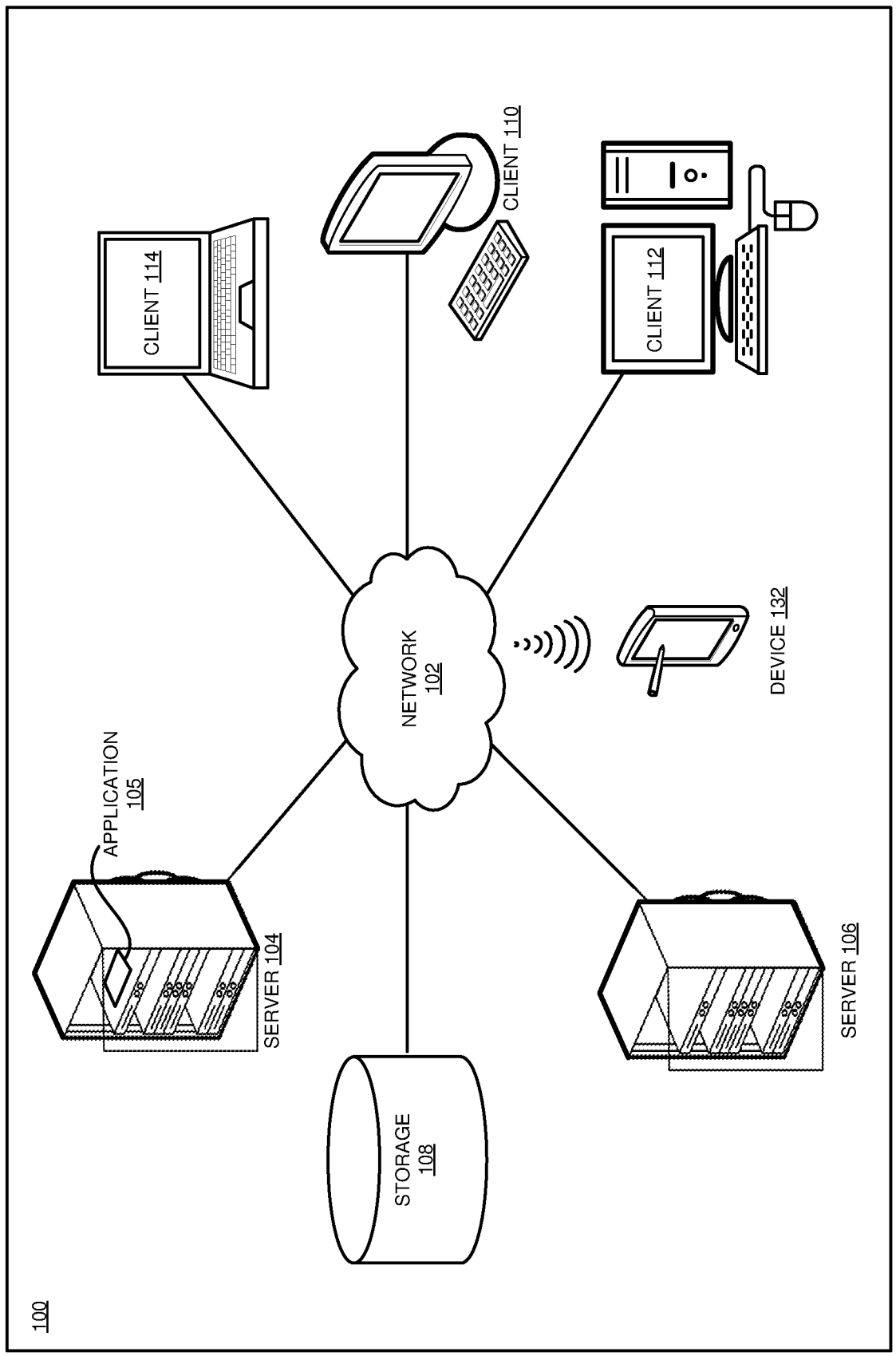
FIG. 1 depicts a block diagram of a network of data processing systems in which illustrative embodiments may be implemented.

The illustrative embodiments recognize that there are occasions when individuals participating in a social network or adding to a website want to communicate, or post, images of people—for example, to memorialize an outing among friends or a child's birthday party. However, individuals depicted in images often want control over whether or not such depictions are shared, with whom, and under what circumstances. For example, consider an image depicting three friends on a vacation. Friend A prefers to share vacation photos with personal friends but not work colleagues. Friend B does not mind the sharing of vacation photos with all of his social network contacts, but only once the vacation is over. And Friend C prefers to share images of himself only after individually reviewing each image. In addition, some parents prefer to limit the distribution of images of their minor children, or prevent such distribution altogether. However, asking permission of those depicted in an image requires asking them, via a social media network or through another means, and typically including the image being queried. This method of asking permission relies on the poster identifying others in the image who should be asked for permission, determining contact information for those others, those being asked replying in a timely manner, and poster adhering to any instructions regarding whether or not, with whom, and under what circumstances the image should be shared. Each step in such a method is manual, error prone, and relies on the individuals depicted to create and enforce their own image depiction policy. In addition, simply asking permission to post an image has the effect of distributing the image, potentially negating the value of asking permission.

The illustrative embodiments recognize that, even when individuals allow images depicting themselves to be posted or communicated over a social network, there are circumstances when those images, or portions of those images, should not be posted or communicated. For example, some systems identify authorized users using biometric identification, such as an individual's face, fingerprint, iris, retina, or other biometric identification. If an image contains sufficient detail of the biometric information usable to access such a system, the image could be usable to access the system without proper authorization. Thus, there may be an unacceptable risk associated with allowing biometric identification information to be widely distributed. In addition, a depicted individual may be unaware of or unable to asses a risk associated with allowing biometric identification information to be widely distributed.

Consequently, the illustrative embodiments recognize that there is an unmet need for an automated mechanism to procure permission to post an image depicting an individual that does not publicly distribute the image for which permission is being sought. The illustrative embodiments also recognize that there is an unmet need to prevent the distribution of biometric PII depicted in an image, even when permission to post the image has been granted.

The illustrative embodiments recognize that the presently available tools or solutions do not address these needs or provide adequate solutions for these needs. The illustrative embodiments used to describe the invention generally address and solve the above-described problems and other problems related to ledger-based image distribution permission and obfuscation.

An embodiment can be implemented as a software application. The application implementing an embodiment can be configured as a modification of an existing electronic communication system, as a separate application that operates in conjunction with an existing electronic communication system, a standalone application, or some combination thereof.

Particularly, some illustrative embodiments provide a method by which an image portion depicting personally identifiable information is identified, a person depicted in the image portion is identified, an encrypted request to allow the image containing the portion to be distributed online is posted, and the image portion obfuscated according to a response to the encrypted request to make the image portion unusable to identify the depicted person.

An embodiment receives an image intended for distribution online, for example to a website or social media network. An embodiment uses an image analysis model to identify, within the image, an image portion containing personally identifiable information. One embodiment uses, as the image analysis model, a set of rules for identifying image data that includes PII, such as a face, fingerprint, palm print, a vein pattern in one's palm or another area of a body, geometry of a face, hand, or another body part, iris, retina, or other image data usable to identify a specific individual. Another embodiment uses, as the image analysis model, a cognitive model trained to identify image data that includes PII. Another embodiment uses a combination of a rule-based model and a cognitive model. Another embodiment uses a modular model, including modules configured to identify particular a particular form of PII. For example, one module in a modular model might be configured to identify image data including a human fingerprint, while another module might be configured to identify image data include a human face. A modular model is configurable with additional modules, to identify additional forms of PII within image data, as a technique to identify such additional forms of PII is developed.

An embodiment uses an online profile to identify a person depicted by the PII in the image portion. In one embodiment, the online profile is a user's profile within a social media network and includes a set of social messages communicated within the social media network. In another embodiment, the online profile includes user information available using a communications network such as the Internet. In another embodiment, the online profile includes information a user provides to the embodiment.

To identify the depicted person, one embodiment determines whether image data in the online profile and image data in the portion identified as including image PII have above a threshold similarity to each other, using any presently-available image comparison technique. For example, if the online profile includes an image of a person's face, and the data in the portion also includes an image of a person's face, an embodiment compares data of the two faces to determine whether the two have above a threshold similarity to each other. As another example, if the online profile includes an image of one of a person's fingerprints, and the data in the portion also includes an image of a person's fingerprint, an embodiment compares data of the two fingerprints to determine whether the two have above a threshold similarity to each other.

To identify the depicted person, another embodiment uses profile information other than image data. One embodiment solicits identification information for an individual depicted in an image to be posted, for example by asking the image poster to provide such identification. Another embodiment relies on the image poster to provide identification information without soliciting the information. An embodiment uses the provided information to match information in an online profile of the depicted individual. For example, if the image poster identifies an individual depicted in the image as John Doe, an embodiment might match this identification with the image poster's contact within a social network who is also named John Doe, Another embodiment uses additional online communications information, such as past interactions on a social network or via another messaging application, a status of a link between the parties (e.g. labelled as "friend" or "work contact", a degree of connection between the parties (e.g. a direct connection or a connection through one or more other users), or another method to disambiguate user profiles if necessary.

An embodiment generates a request for permission to distribute the image PII for a person depicted in the PII. The request includes an identification of the image including the image PII and identification of those who are being asked for permission. The request is configurable to include the image PII or a complete or partial image of which the image PII is a portion. The request is also configurable to include information identifying the user originating the image posting. Including the image PII, with or without context and originating user information helps the request recipient evaluate whether or not to grant posting permission. An embodiment encrypts the generated request, using any presently-available encryption technique, and posts the request as a transaction in a publicly-accessible distributed encrypted ledger.

A publicly-accessible distributed encrypted ledger, also colloquially known as a blockchain, is a publicly-accessible record of transactions performed on a transaction system. An embodiment also uses user profile information to notify those who are being asked for permission of the request, along with how to access and respond to the request. Separating the request from the notification, and encrypting the request itself, allows an embodiment to solicit permission without distributing PII beforehand.

An embodiment receives a response to the request for permission to distribute the image PII. In one embodiment, the response grants or denies permission for the image PII to be posted. In another embodiment, the response also includes optional restrictions governing posting of the image PII. Some non-limiting examples of optional restrictions include a set of online locations at which the image including the PII is allowed to be posted (i.e. a whitelist), a set of online locations at which the image including the PII is not allowed to be posted (i.e. a blacklist), a limit on other users of a social network who are allowed to see the image (e.g. only contacts in the "friends" category relative to the depicted individual, or only first-degree connections of the depicted individual), an expiration time for the image after which the image is no longer accessible (e.g. five minutes or one day), and a combination of restrictions.

If the response denies permission for the image PII to be posted, or if the response specifies restrictions on the posting, an embodiment obfuscates the image PII within the image according to the response and any specified restrictions. An embodiment obfuscates the image PII by altering data of an image portion containing the image PII. The alteration makes the image portion unusable to identify the person who is the subject of the image PII. Some non-limiting examples of alterations that make the image portion unusable for identification include replacing the image PII with a black, white, or colored area, replacing the image PII with a lower-resolution version of the image PII that is below a threshold resolution required for identification, and replacing the image PII with a distorted version of the image PII that is below a threshold quality measure required for identification. Once the image has been obfuscated, an embodiment allows the image to be posted according to any specified restrictions.

The manner of ledger-based image distribution permission and obfuscation described herein is unavailable in the presently available methods in the technological field of endeavor pertaining to image communication. A method of an embodiment described herein, when implemented to execute on a device or data processing system, comprises substantial advancement of the functionality of that device or data processing system in identifying an image portion depicting personally identifiable information and a person depicted in the image portion, posting an encrypted request to allow the image containing the portion to be distributed online, and obfuscating the image portion according to a response to the encrypted request to make the image portion unusable to identify the depicted person.

The illustrative embodiments are described with respect to certain types of image data, personally identifiable information, postings, requests, resolutions, obfuscations, ledgers, thresholds, validations, responses, adjustments, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
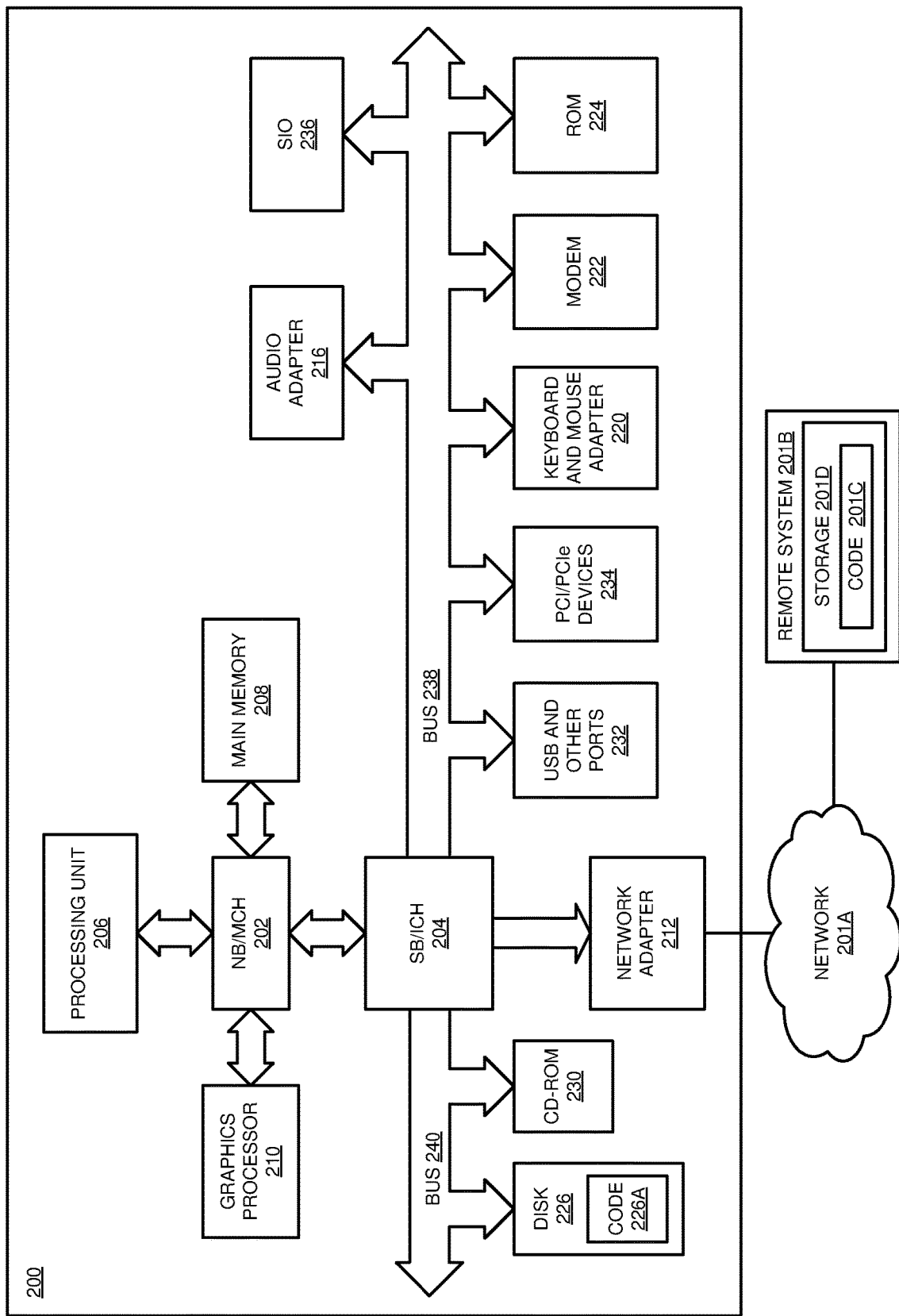
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Application 105 executes in any of servers 104 and 106, clients 110, 112, and 114, and device 132. Application 105 processes an image obtained from any source, including but not limited to a camera included in device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
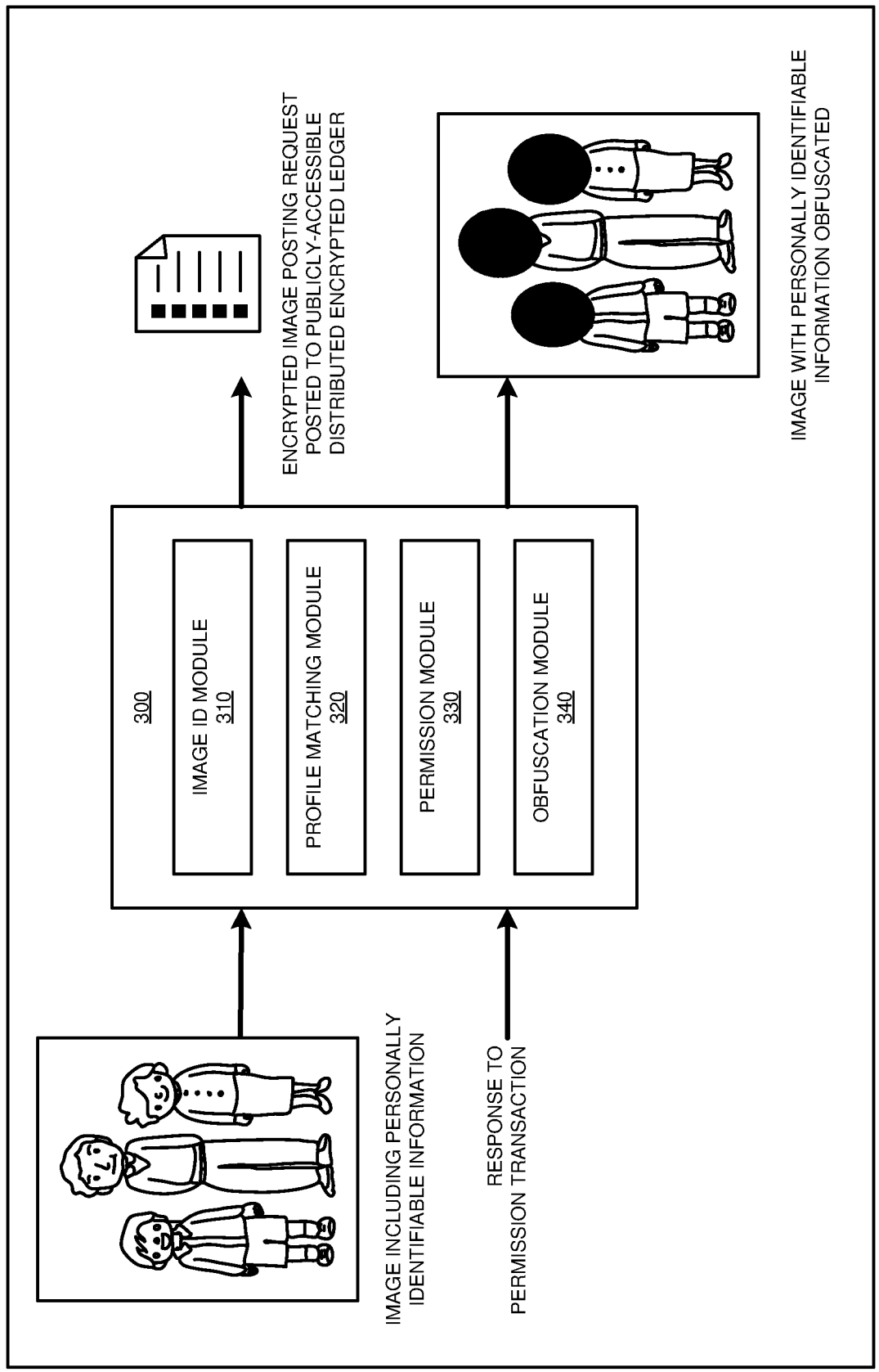
FIG. 3 depicts a block diagram of an example configuration for ledger-based image distribution permission and obfuscation in accordance with an illustrative embodiment.

With reference to FIG. 3, this figure depicts a block diagram of an example configuration for ledger-based image distribution permission and obfuscation in accordance with an illustrative embodiment. Application 300 executes in any of servers 104 and 106, clients 110, 112, and 114, and device 132 in FIG. 1.

Image identification module 310 uses an image analysis model to identify, within an image intended for distribution online, an image portion containing personally identifiable information. One implementation of module 310 uses, as the image analysis model, a set of rules for identifying image data that includes PII, such as a face, fingerprint, iris, retina, or other image data usable to identify a specific individual. Another implementation of module 310 uses, as the image analysis model, a cognitive model trained to identify image data that includes PII. Another implementation of module 310 uses a combination of a rule-based model and a cognitive model. Another implementation of module 310 uses a modular model, including modules configured to identify particular a particular form of PII.

Profile matching module 320 uses an online profile to identify a person depicted by the PII in the image portion. In one implementation of module 320, the online profile is a user's profile within a social media network. In another implementation of module 320, the online profile includes user information available using a communications network such as the Internet. In another implementation of module 320, the online profile includes information a user provides to application 300. To identify the depicted person, module 320 determines whether image data in the online profile and image data in the portion identified as including image PII has above a threshold similarity, using any presently-available image comparison technique. Module 320 also uses profile information other than image data to identify the depicted person. One implementation of module 320 solicits identification information for an individual depicted in an image to be posted, for example by asking the image poster to provide such identification. Another implementation of module 320 relies on the image poster to provide identification information without soliciting the information. Module 320 uses the provided information to match information in an online profile of the depicted individual. Module 320 uses additional online communications information, such as past interactions on a social network or via another messaging application, a status of a link between the parties (e.g. labelled as "friend" or "work contact", a degree of connection between the parties (e.g. a direct connection or a connection through one or more other users), or another method to disambiguate user profiles if necessary.

Permission module 330 generates a request for permission to post the image PII for a person depicted in the PII. The request includes an identification of the image including the image PII and identification of those who are being asked for permission. The request is configurable to include the image PII or a complete or partial image of which the image PII is a portion. The request is also configurable to include information identifying the user originating the image posting. Including the image PII, with or without context and originating user information helps the request recipient evaluate whether or not to grant posting permission. Module 330 encrypts the generated request, using any presently-available encryption technique, and posts the request as a transaction in a publicly-accessible distributed encrypted ledger. Module 330 also uses user profile information to notify those who are being asked for permission of the request, along with how to access and respond to the request. Separating the request from the notification, and encrypting the request itself, allows application 300 to solicit permission without distributing PII beforehand.

Module 330 receives a response to the request for permission to post the image PII. In one implementation, the response grants or denies permission for the image PII to be posted. In another implementation, the response also includes optional restrictions governing posting of the image PII. Some non-limiting examples of optional restrictions include a set of online locations at which the image including the PII is allowed to be posted (i.e. a whitelist), a set of online locations at which the image including the PII is not allowed to be posted (i.e. a blacklist), a limit on other users of a social network who are allowed to see the image (e.g. only contacts in the "friends" category relative to the depicted individual, or only first-degree connections of the depicted individual), an expiration time for the image after which the image is no longer accessible (e.g. five minutes or one day), and a combination of restrictions.

If the response denies permission for the image PII to be posted, or if the response specifies restrictions on the posting, obfuscation module 340 obfuscates the image PII within the image according to the response and any specified restrictions. Module 340 obfuscates the image PII by altering data of an image portion containing the image PII. The alteration makes the image portion unusable to identify the person who is the subject of the image PII. Some non-limiting examples of alterations that make the image portion unusable for identification include replacing the image PII with a black, white, or colored area, replacing the image PII with a lower-resolution version of the image PII that is below a threshold resolution required for identification, and replacing the image PII with a distorted version of the image PII that is below a threshold quality measure required for identification. Once the image has been obfuscated, application 300 allows the image to be posted according to any specified restrictions.

Figure 4:
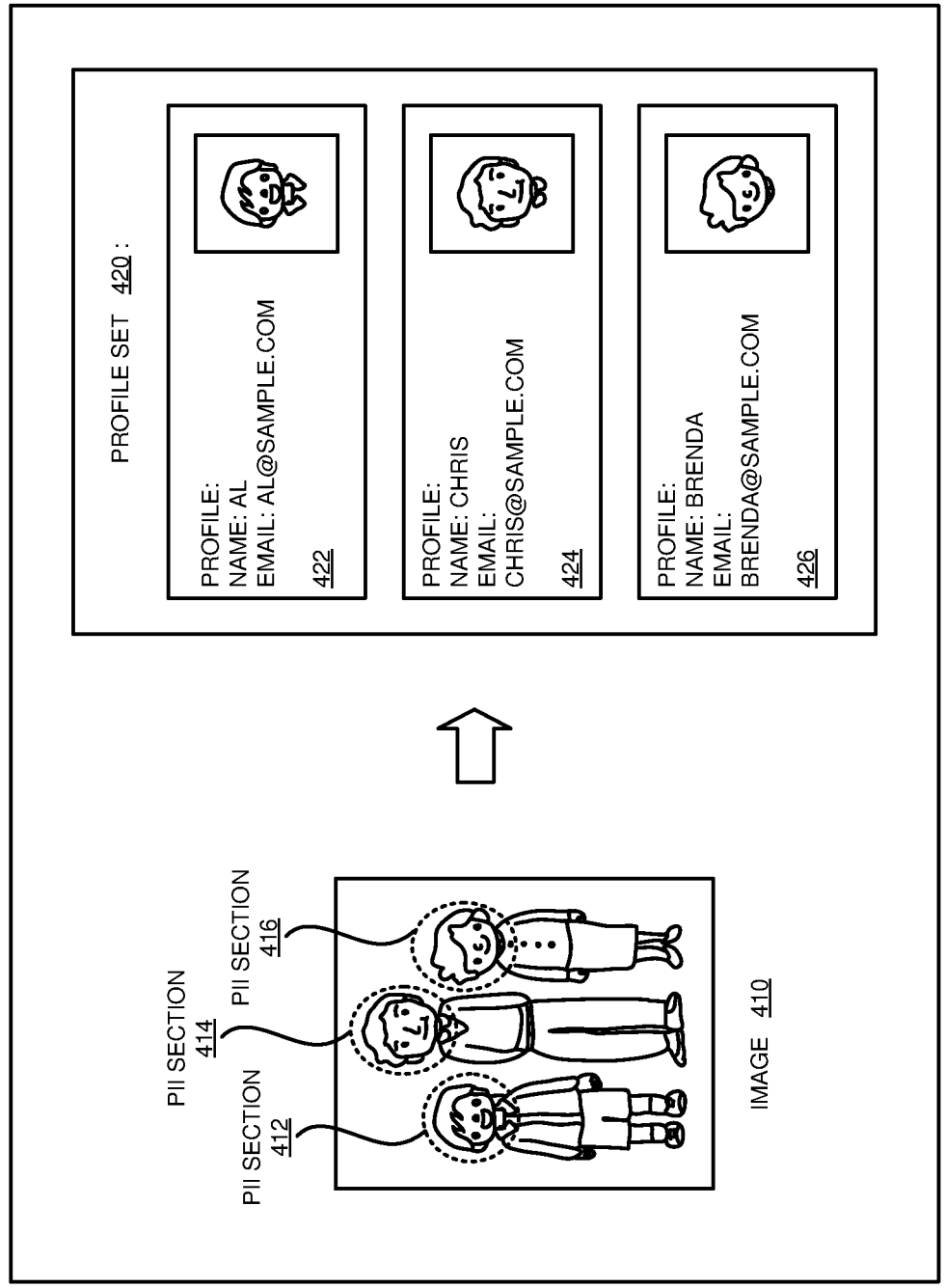
FIG. 4 depicts an example of ledger-based image distribution permission and obfuscation in accordance with an illustrative embodiment.

With reference to FIG. 4, this figure depicts an example of ledger-based image distribution permission and obfuscation in accordance with an illustrative embodiment. The example can be executed using application 300 in FIG. 3.

Image 410 is intended for distribution online. Application 300 identifies PII sections 412, 414, and 416, each including image data depicting a person's face.

Using profile set 420, application 300 identifies the individuals depicted in PII sections 412, 414, and 416. In particular, application 300 determines that image data in profile 422 and image data in PII section 412 have above a threshold similarity to each other, image data in profile 424 and image data in PII section 414 have above a threshold similarity to each other, and image data in profile 426 and image data in PII section 416 have above a threshold similarity to each other.

Figure 5:
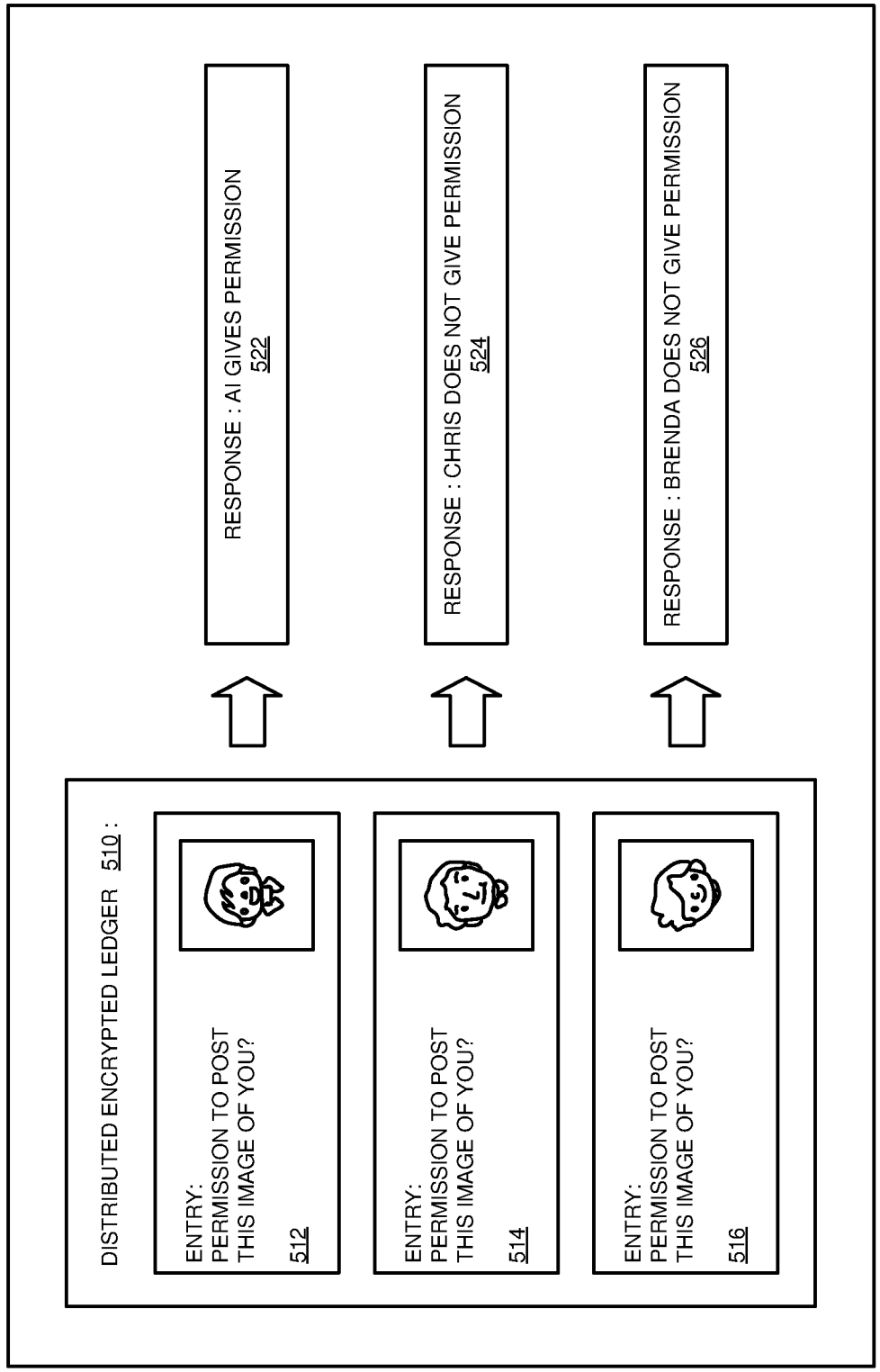
FIG. 5 depicts a continued example of ledger-based image distribution permission and obfuscation in accordance with an illustrative embodiment.

With reference to FIG. 5, this figure depicts a continued example of ledger-based image distribution permission and obfuscation in accordance with an illustrative embodiment. The example can be executed using application 300 in FIG. 3.

As depicted, application 300 posts three transactions in distributed encrypted ledger 510. Because image data in PII section 412 and image data in profile 422 matched, application 300 uses the information in profile 422 to generate entry 512, including image data in PII section 412 and identification of the subject of profile 422 (not shown). Similarly, application 300 uses the information in profile 424 to generate entry 514, including image data in PII section 414 and identification of the subject of profile 424 (not shown). Similarly, application 300 uses the information in profile 426 to generate entry 516, including image data in PII section 416 and identification of the subject of profile 426 (not shown). Each of entries 512, 514, and 516 is encrypted before being posted to ledger 510. An embodiment also uses user profile information to notify those who are being asked for permission of the request, along with how to access and respond to the request.

As depicted, application 300 receives responses 522, 524, and 526. In particular, A1, the subject of profile 422, gives permission to distribute PII section 412. However, Chris and Brenda, the subjects of profiles 424 and 426 respectively, do not give permission to distribute PII sections 414 and 416.

With reference to FIG. 6, this figure depicts a continued example of ledger-based image distribution permission and obfuscation in accordance with an illustrative embodiment. Responses 522, 524, and 526 are the same as responses 522, 524, and 526 in FIG. 5. The example can be executed using application 300 in FIG. 3.

As depicted in obfuscated image 610, because A1 gave permission to distribute PII section 412, PII section 412 is not obfuscated. However, because Chris and Brenda did not give permission to distribute PII sections 414 and 416, PII sections 414 and 416 have been replaced with obfuscated sections 614 and 616 respectively.

With reference to FIG. 7, this figure depicts a flowchart of an example process for ledger-based image distribution permission and obfuscation in accordance with an illustrative embodiment. Process 700 can be implemented in application 300 in FIG. 3.

In block 702, the application uses an image analysis model to identify, within an image intended for distribution online, an image portion depicting personally identifiable information. In block 704, the application uses an online profile to identify a person depicted in the image portion. In block 706, the application posts, in a publicly-accessible distributed encrypted ledger, a transaction comprising an encrypted request to allow the image to be distributed online. In block 712, the application checks whether a response to the request requires distribution with obfuscation. If yes ("YES" path of block 712), in block 714, the application obfuscates the image portion depicting PII. If not ("NO" path of block 712), in block 716, the application allows distribution of the image. Then the application ends.

Thus, a computer implemented method, system or apparatus, and computer program product are provided in the illustrative embodiments for ledger-based image distribution permission and obfuscation and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   identifying, using an image analysis model within an image intended for distribution online, an image portion depicting personally identifiable information, the personally identifiable information comprising image data usable to identify a specific individual;
   identifying, using an online profile, a person depicted in the image portion, the online profile including using a user's profile within a social media network which includes a set of social messages communicated within the social media network;
   posting, in a publicly-accessible distributed encrypted ledger, a transaction, the transaction comprising an encrypted request to allow the image to be distributed online; and
   obfuscating, according to a response to the request, the image portion, the obfuscating comprising altering data of the image portion, the altering making the image portion unusable to identify the person.

2. The computer-implemented method of claim 1, wherein the personally identifiable information comprises an image depicting a human face.

3. The computer-implemented method of claim 1, wherein the online profile comprises a set of social media messages and the image analysis model comprises using a rule-based model and a cognitive model, and further comprising receiving restrictions governing posting of the image data including online locations at which the image data is allowed to be posted, not allowed to be posted, a limit on users of a social network who are allowed to see the image data, and an expiration time for the image data after which the image data is no longer accessible.

4. The computer-implemented method of claim 1, wherein identifying, using the online profile, the person depicted in the image portion comprises determining that the image portion is above a threshold similarity to image data in the online profile.

5. The computer-implemented method of claim 1, wherein identifying, using the online profile, the person depicted in the image portion comprises identifying, using data in the online profile, the person, the data in the online profile comprising other than image data.

6. The computer-implemented method of claim 1, wherein altering data of the image portion comprises replacing the image portion with a second image portion, the second image portion comprising a reduced-resolution version of the image portion, and further comprising generating a request for permission to distribute the image data which includes an identification of the image data and identification of those who are being asked for permission, the request being configurable to include information identifying a user originating an image posting.

7. The computer-implemented method of claim 1, wherein altering data of the image portion comprises replacing the image portion with a second image portion, the second image portion comprising a distorted version of the image portion.

8. A computer usable program product comprising one or more computer-readable storage devices, and program instructions stored on at least one of the one or more storage devices, the stored program instructions comprising:
   program instructions to identify, using an image analysis model within an image intended for distribution online, an image portion depicting personally identifiable information, the personally identifiable information comprising image data usable to identify a specific individual;
   program instructions to identify, using an online profile, a person depicted in the image portion, the online profile including using a user's profile within a social media network which includes a set of social messages communicated within the social media network;
   program instructions to post, in a publicly-accessible distributed encrypted ledger, a transaction, the transaction comprising an encrypted request to allow the image to be distributed online; and
   program instructions to obfuscate, according to a response to the request, the image portion, the obfuscating comprising altering data of the image portion, the altering making the image portion unusable to identify the person.

9. The computer usable program product of claim 8, wherein the personally identifiable information comprises an image depicting a human face and the identifying the person further includes online communications information including past interactions on a social network or via another messaging application or a status of a link between parties.

10. The computer usable program product of claim 8, wherein the online profile comprises a set of social media messages, and the image analysis model comprises using a rule-based model and a cognitive model, and further comprising receiving restrictions governing posting of the image data including online locations at which the image data is allowed to be posted, not allowed to be posted, a limit on users of a social network who are allowed to see the image data, and an expiration time for the image data after which the image data is no longer accessible.

11. The computer usable program product of claim 8, wherein program instructions to identify, using the online profile, the person depicted in the image portion comprises program instructions to determine that the image portion is above a threshold similarity to image data in the online profile.

12. The computer usable program product of claim 8, wherein program instructions to identify, using the online profile, the person depicted in the image portion comprises program instructions to identify, using data in the online profile, the person, the data in the online profile comprising other than image data.

13. The computer usable program product of claim 8, wherein program instructions to alter data of the image portion comprises program instructions to replace the image portion with a second image portion, the second image portion comprising a reduced-resolution version of the image portion.

14. The computer usable program product of claim 8, wherein program instructions to alter data of the image portion comprises program instructions to replace the image portion with a second image portion, the second image portion comprising a distorted version of the image portion.

15. The computer usable program product of claim 8, wherein the stored program instructions are stored in the at least one of the one or more storage devices of a local data processing system, and wherein the stored program instructions are transferred over a network from a remote data processing system, and further comprising generating a request for permission to distribute the image data which includes an identification of the image data and identification of those who are being asked for permission, the request being configurable to include information identifying a user originating an image posting.

16. The computer usable program product of claim 8, wherein the stored program instructions are stored in the at least one of the one or more storage devices of a server data processing system, and wherein the stored program instructions are downloaded over a network to a remote data processing system for use in a computer readable storage device associated with the remote data processing system, and further comprising a program product that generates a request for permission to post the image data, the request includes an identification of the image data, those who are being asked for permission, and to include information identifying a user originating the image posting, including the image data, with or without context.

17. A computer system comprising:
one or more processors;
one or more computer-readable memories;
one or more non-transitory computer-readable storage devices; and
program instructions stored on at least one of the one or more non-transitory computer-readable storage devices for execution by at least one of the one or more processors via at least one of the one or more memories, the stored program instructions comprising:
  program instructions to identify, using an image analysis model within an image intended for distribution online, an image portion depicting personally identifiable information, the personally identifiable information comprising image data usable to identify a specific individual;
  program instructions to identify, using an online profile, a person depicted in the image portion, the online profile including using a user's profile within a social media network which includes a set of social messages communicated within the social media network;
  program instructions to post, in a publicly-accessible distributed encrypted ledger, a transaction, the transaction comprising an encrypted request to allow the image to be distributed online;
  and program instructions to obfuscate, according to a response to the request, the image portion, the obfuscating comprising altering data of the image portion, the altering making the image portion unusable to identify the person,
  wherein at least the program instructions to identify the image portion are stored on the on at least one of the one or more storage devices for execution by at least one of the one or more processors via at least one of the one or more memories.

18. The computer system of claim 17, wherein the personally identifiable information comprises an image depicting a human face.

19. The computer system of claim 17, wherein the online profile comprises a set of social media messages.

20. The computer system of claim 17, wherein program instructions to identify, using the online profile, the person depicted in the image portion comprises program instructions to determine that the image portion is above a threshold similarity to image data in the online profile, and the identifying of the person includes online communications information, including past interactions on a social network or another messaging application and a status of a link between parties.

* * * * *